United States Patent
Kitagawa et al.

(10) Patent No.: US 12,495,389 B2
(45) Date of Patent: Dec. 9, 2025

(54) SYSTEM, METHOD, DEVICE, AND PROGRAM FOR POSITIONING ENHANCEMENT IN ENVIRONMENT WITH REPEATERS

(71) Applicant: RAKUTEN MOBILE, INC., Tokyo (JP)

(72) Inventors: Koichiro Kitagawa, Tokyo (JP); Awn Muhammad, Tokyo (JP); Pankaj Shete, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/916,277

(22) PCT Filed: Apr. 28, 2022

(86) PCT No.: PCT/US2022/026653
§ 371 (c)(1),
(2) Date: Sep. 30, 2022

(87) PCT Pub. No.: WO2023/211441
PCT Pub. Date: Nov. 2, 2023

(65) Prior Publication Data
US 2024/0214977 A1    Jun. 27, 2024

(51) Int. Cl.
*H04W 64/00* (2009.01)
*H04W 88/04* (2009.01)

(52) U.S. Cl.
CPC .......... *H04W 64/006* (2013.01); *H04W 88/04* (2013.01)

(58) Field of Classification Search
CPC ... H04W 64/00; H04W 4/029; H04W 84/047; H04W 88/04; H04W 64/003; H04W 4/33;
(Continued)

(56) References Cited

U.S. PATENT DOCUMENTS

| | | |
|---|---|---|
| 2005/0113117 A1 | 5/2005 | Bolin et al. |
| 2010/0054174 A1 | 3/2010 | Aso |

(Continued)

OTHER PUBLICATIONS

International Search Report for PCT/US2022/026653 dated, Jul. 19, 2022 (PCT/ISA/210).
(Continued)

*Primary Examiner* — Kwasi Karikari
(74) *Attorney, Agent, or Firm* — Sughrue Mion, PLLC

(57) ABSTRACT

A method for enhanced positioning of a user device in a telecommunication network that includes one or more repeaters in a communication between a network element and the user device may be provided. The method may include assigning, by the network element, one or more transaction beam ID, each of the one or more transaction beam ID being associated with a respective repeater from the one or more repeaters in the telecommunication network; generating, by the network element, a positioning reference relationship table, the positioning reference relationship table including a relationship between a positioning reference signal ID and each of the one or more transaction beam ID, and receiving, by a core element, an adjusted position of the user device, the adjusted position of the user device being adjusted for a location of a specific repeater between the network element and the user device.

18 Claims, 11 Drawing Sheets

(58) Field of Classification Search
CPC ... H04W 4/025; H04W 40/22; H04W 36/322; H04W 4/027
See application file for complete search history.

(56) References Cited

U.S. PATENT DOCUMENTS

| | | | |
|---|---|---|---|
| 2018/0176720 | A1 | 6/2018 | Mcmullen et al. |
| 2019/0380056 | A1* | 12/2019 | Lee ................... H04B 7/0695 |
| 2020/0296680 | A1* | 9/2020 | Akkarakaran ........ H04W 4/029 |
| 2020/0322755 | A1* | 10/2020 | Berggren ............... H04W 4/02 |
| 2020/0403689 | A1* | 12/2020 | Rofougaran ........ H04W 52/245 |
| 2022/0053486 | A1 | 2/2022 | Abedini et al. |
| 2023/0097862 | A1* | 3/2023 | Horn .................... G01S 13/765 455/456.1 |

OTHER PUBLICATIONS

Written Opinion of the International Searching Authority for PCT/US2022/026653 dated Jul. 19, 2022 (PCT/ISA/237).

\* cited by examiner

SYSTEM, METHOD, DEVICE, AND PROGRAM FOR POSITIONING ENHANCEMENT IN ENVIRONMENT WITH REPEATERS

CROSS REFERENCE TO RELATED APPLICATIONS

This application is a National Stage of International Application No. PCT/US2022/026653 filed Apr. 28, 2022.

FIELD OF THE INVENTION

The present disclosure relates to estimating the position of one or more user devices in a telecommunication network and/or wireless network that may include smart repeaters. In particular, the present disclosure relates to a method, apparatus, and system for estimating the position of the one or more user devices telecommunication network and/or wireless network with invisible smart repeaters.

BACKGROUND OF THE INVENTION

In a telecommunication network, smart repeaters are often used to amplify weak radio frequency (RF) signals and extend the area covered by a network device of the telecommunication network. However, while smart repeaters extend the range of a RF signal, smart repeaters are invisible to network elements such as cell towers or base stations. Therefore, when a network element estimates the position of a user device, the presence of a smart repeater in between (invisible to the network element) can cause a drastic change in beam direction that the network element may attribute to the user device. This causes serious errors in the estimation of the user device position.

Accurate positioning is critical to providing continuous and efficient network services to users and their devices. However, the presence of an invisible smart repeater in a communication between a network element (e.g., base station) and a user device may introduce drastic errors in position estimation of the user device. These errors may cause disruptions in network services to the user device, essentially reducing the efficiency, reliability, availability, and quality of service of the telecommunication network.

Therefore, methods to identify smart repeaters in a telecommunication network and adjust erroneous position estimates for a user device when a smart repeater is identified are needed.

SUMMARY

According to embodiments, a method for enhanced positioning of a user device in a telecommunication network that includes one or more repeaters in a communication between a network element and the user device may be provided. The method may be performed by one or more processors and may include assigning, by the network element, one or more transaction beam ID, each of the one or more transaction beam ID being associated with a respective repeater from the one or more repeaters in the telecommunication network; generating, by the network element, a positioning reference relationship table, the positioning reference relationship table including a relationship between a positioning reference signal ID and each of the one or more transaction beam ID, the positioning reference signal ID being associated with a positioning reference signal, and each of the one or more transaction beam ID being associated with the respective repeater from the one or more repeaters in the telecommunication network; and receiving, by a core element, an adjusted position of the user device, the adjusted position of the user device being adjusted for a location of a specific repeater between the network element and the user device.

According to embodiments, an apparatus for enhanced positioning of a user device in a telecommunication network that includes one or more repeaters in a communication between a network element and the user device may be provided. The apparatus may include at least one memory configured to store computer program code; and at least one processor configured to access the computer program code and operate as instructed by the computer program code. The program may include first assigning code configured to cause a first processor to assign one or more transaction beam ID, each of the one or more transaction beam ID being associated with a respective repeater from the one or more repeaters in the telecommunication network; first generating code configured to cause the first processor to generate a positioning reference relationship table, the positioning reference relationship table including a relationship between a positioning reference signal ID and each of the one or more transaction beam ID, the positioning reference signal ID being associated with a positioning reference signal, and each of the one or more transaction beam ID being associated with the respective repeater from the one or more repeaters in the telecommunication network; and first receiving code configured to cause a second processor to receive an adjusted position of the user device, the adjusted position of the user device being adjusted for a location of a specific repeater between the network element and the user device.

According to embodiments, a non-transitory computer readable medium may be provided. The non-transitory computer readable medium may store a program causing a computer to execute a process. The process may include assigning, by a network element, one or more transaction beam ID, each of the one or more transaction beam ID being associated with a respective repeater from one or more repeaters in a telecommunication network; generating, by the network element, a positioning reference relationship table, the positioning reference relationship table including a relationship between a positioning reference signal ID and each of the one or more transaction beam ID, the positioning reference signal ID being associated with a positioning reference signal, and each of the one or more transaction beam ID being associated with the respective repeater from the one or more repeaters in the telecommunication network; and receiving, by a core element, an adjusted position of the user device, the adjusted position of the user device being adjusted for a location of a specific repeater between the network element and the user device.

BRIEF DESCRIPTION OF THE DRAWINGS

Features, advantages, and significance of exemplary embodiments of the disclosure will be described below with reference to the accompanying drawings, in which like signs denote like elements.

DETAILED DESCRIPTION

Figure 1:
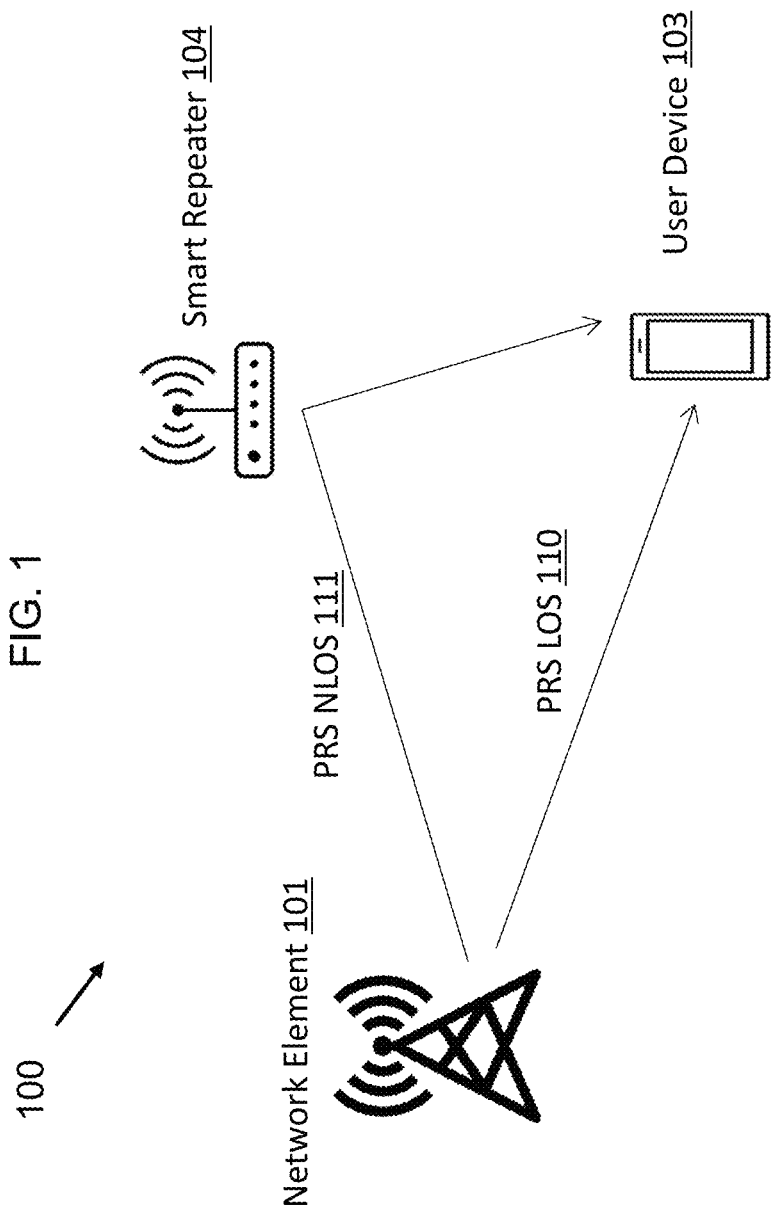
FIG. 1 is an example diagrammatic illustration of a network architecture in which the systems and/or methods described in the present disclosure may be implemented.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

As is traditional in the field, embodiments may be described and illustrated in terms of blocks that carry out a described function or functions. These blocks, which may be referred to herein as units or modules or the like, may be physically implemented by analog or digital circuits such as logic gates, integrated circuits, microprocessors, microcontrollers, memory circuits, passive electronic components, active electronic components, optical components, hardwired circuits, or the like, and may be driven by firmware and software. The circuits may be, for example, embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise.

As stated above, accurate positioning of user devices and network devices is important to provide continuous and efficient service to the users of the telecommunication networks. While smart repeaters expand the reach of the telecommunication network's signals, they may be invisible to the elements of the telecommunication network. It is difficult for network elements and user device to identify signal propagation that includes repeaters. As an example, if a smart repeater is present in or facilitating a communication between a network element (e.g., base station) and a user device, the network device may not know that the smart repeater is present and facilitating the communication.

Positioning accuracy is very highly dependent on propagation paths of radio frequency (RF) signals. When the network element assumes that the position of the smart repeater is the position of the user device, the network element may potentially change beam directions and signal strength drastically to provide network services at the position of the smart repeater. The network element may view these changes for an invisible smart repeater as drastic scattering and/or reflection with respect to the user device, ultimately resulting in inaccurate estimation of positioning. Detecting the errors in positioning may not be easy. Metrics like reference signal received power (RSRP) and reference signal received quality (RSRQ) are used as accuracy metrics but because the smart repeaters produce strong signals, these metrics may not be a reliable measure of accuracy.

Some solutions may include adding specifications so that smart repeaters support positioning as well, e.g., implement a positioning scheme at the smart repeaters. However, implementing a positioning scheme is a trivial solution. Not only is it trivial, it would be an expensive solution for the telecommunication network with respect to both financial and computing resources.

Therefore, methods to identify smart repeaters or positions of smart repeaters and account or adjust the position of user devices accordingly are needed.

Embodiments of the present disclosure are directed to identifying signals transmitted by smart repeaters using network elements (e.g., gNodeB, eNodeB, etc.). According to some embodiments of the present disclosure, telecommunication networks may define resource sets associated with transmitting signals transmitted from smart receivers and receiving signals received by smart repeaters at associated network elements. These resource sets may be used to identify smart repeaters in a propagation path for an RF signal.

Embodiments of the present disclosure are also directed to accurate positioning of user devices by accounting for the positions of smart repeaters. Repeater specific parameters may be applied while positioning to accurately determine the positions of the user devices.

As an example, according to embodiments of the present disclosure, a network element may identify beam IDs associated with smart repeaters in received or transmitted signals. If a beam ID associated with a smart repeater is identified, those signals may be treated as though they are through a smart repeater, and repeater specific positioning parameters may be applied to determine the positon of the smart repeater and vis-à-vis also determine an accurate position of the user device. According to some embodiments, the user devices may identify beam IDs associated with smart repeaters in received or transmitted signals and then apply repeater specific positioning to determine the position of the smart repeater.

According to embodiments of the present disclosure, a network element of the telecommunication network, or a core network element of the telecommunication network may assign a transaction beam ID or beam ID (used interchangeably herein) to a specific repeater associated with the network element. If beam IDs are already assigned at a network element, then the possible beam ID values may be separated into sets and each set may be assigned for specific purposes. As an example, if there are 64 beam IDs available, beam IDs of 0-31 may be assigned for beam forming at the network element, and beam IDs 32-63 may be assigned to specific repeaters for repeater beam forming. In some embodiments, the beam IDs may be specific to each network element (e.g., gNodeB and eNodeB). In some other embodiments, the beam IDs may be common to a specific part or the whole telecommunication network. The transaction beam ID may be assigned incrementally, may be assigned based on a type of smart repeater, or may be assigned based on a capability of the smart repeaters. In some embodiments, the transaction beam IDs may be specifically for uplink or downlink provisioning.

According to an embodiment of the present disclosure, the network element may generate a positioning reference relationship table defining a relationship between a positioning reference signal (PRS) ID and a transaction beam ID. Embodiments of the present disclosures may not be limited to a positioning reference signal (PRS). According to embodiments of the present disclosure, any suitable reference signal may be used. According to embodiments, a sounding reference signal may be used, for example, during uplink positioning. The transaction beam ID may be configured for or correspond to a specific smart repeater. The network element may generate the positioning reference signal dedicated to a specific smart repeater by generating a positioning reference signal having a PRS ID corresponding to the transaction beam ID for the specific smart repeater. The network element may then transmit the generated positioning reference signal with the PRS ID to the specific smart repeater.

When a user device measures the positioning reference signal, the user device may report the PRS ID in the positioning reference signal to the network element or the core network element. The network element or core network element may use the positioning reference relationship table to identify the beam ID associated with the received PRS ID, essentially identifying the smart repeater in the propagation path between the network element and the user device.

In some exemplary embodiments, the network element may configure the positioning reference relationship table that maps a transaction beam ID to a PRS ID of a positioning reference signal. However, the network element may transmit or broadcast the positioning reference relationship table to the user device, and one or more user devices in associated with the network element may store the positioning reference relationship table.

Using the positioning reference relationship table, not only may the network element identify the smart repeater in the propagation path of the network element, the user devices of a telecommunication network may also be able to identify the smart repeater in its propagation path.

According to some embodiments of the present disclosure, the core network element or the network element may determine and/or calculate an accurate position of the user device, and the calculated position of the user device may be an adjusted position of the user device with respect to the identified smart repeater. As stated above, when a smart repeater may be present in the propagation path of a network element towards a user device, the network element may calculate an erroneous the position of the user device due to the divergence/distortion of the signal because of the smart repeater. The identification of the smart repeater in the propagation path enables the network element to determine an accurate and adjusted position of the user device, eliminating the impact of the divergence/distortion caused by the smart repeater.

FIG. 1 is an exemplary illustration of a network architecture 100 in which the systems and/or methods described in the present disclosure may be implemented.

As shown in FIG. 1, a telecommunication network 100 may include a network element 101, a user device 103, and smart repeater 104.

As shown in FIG. 1, the network element 101 may determine the position of user device 103 directly using positioning reference signal 110 when the network element and the user device are within line of sight (LOS) of each other. When the PRS 110 may be transmitted and received by the network element, the network element 101 may determine the position of the user device 103 accurately and easily based on the characteristics the transmitted and received PRS 110. The PRS 110 may be used to measure the distance between the network element 101 and user device 103 based on reference signal received power (RSRP), received signal strength indicator (RSSI), reference signal received quality (RSRQ), and/or beam information. In some embodiments, time lag between transmission and receipt of the PRS between the network element 101 and user device 103, position information related to the user device 103, power information related to the user device 103, power information related to the network element 101, time of arrival of the PRS, or angle information related to a reception of the PRS may also be used to determine the position of the user device 103.

However, sometimes the network element 101 and the user device 103 may not be within each other's LOS (i.e., No Line Of Sight (NLOS)) or they may be too far from each other and require a smart repeater 104 to extend/propagate the signals. As an example, the network element 101 may transmit PRS 111 that may pass through a smart repeater 104 to be received by user device 103. Since the smart repeater 104 may be invisible as a repeater to the network element 101, and since the position of the smart repeater 104 and user device 103 is not aligned, the network element may make drastic errors in determining the position of the user device 103. The position of user device 103 determined based on PRS 110 may be more accurate than the position of the user device 103 based on PRS 111.

Embodiments of the present disclosure may enable network element 101 to identify the smart repeater 104 in its propagation path. Embodiments of the present disclosure may also enable the network element 101, core network element 505, or user device 103 to correct and/or compensate for the distortion caused because of the smart repeater 104.

As an example, the network element 101 may assign a transaction beam ID or beam ID (used interchangeably herein) to the smart repeater 104 associated with the network element 101. As another example, beam IDs 32-63 may be assigned to specific repeaters for repeater beam forming. Using the beam IDs and associating the beam IDS (or transaction IDs) with PRS IDs, the network element 101 may generate a positioning reference relationship table. The network element 101 may generate the positioning reference signal dedicated to the smart repeater 104 by generating a positioning reference signal having a PRS ID corresponding to the beam ID for the smart repeater 104. The network element may then transmit the generated PRS 111 with the PRS ID to the smart repeater 104.

When a user device 103 may measure PRS 111, the user device may report the PRS ID in the positioning reference signal to the network element 101. The network element 101 may use the positioning reference relationship table to identify the beam ID associated with the received PRS ID, essentially identifying the smart repeater 104 in the (NLOS) propagation path between the network element 101 and the user device 103.

Figure 2:
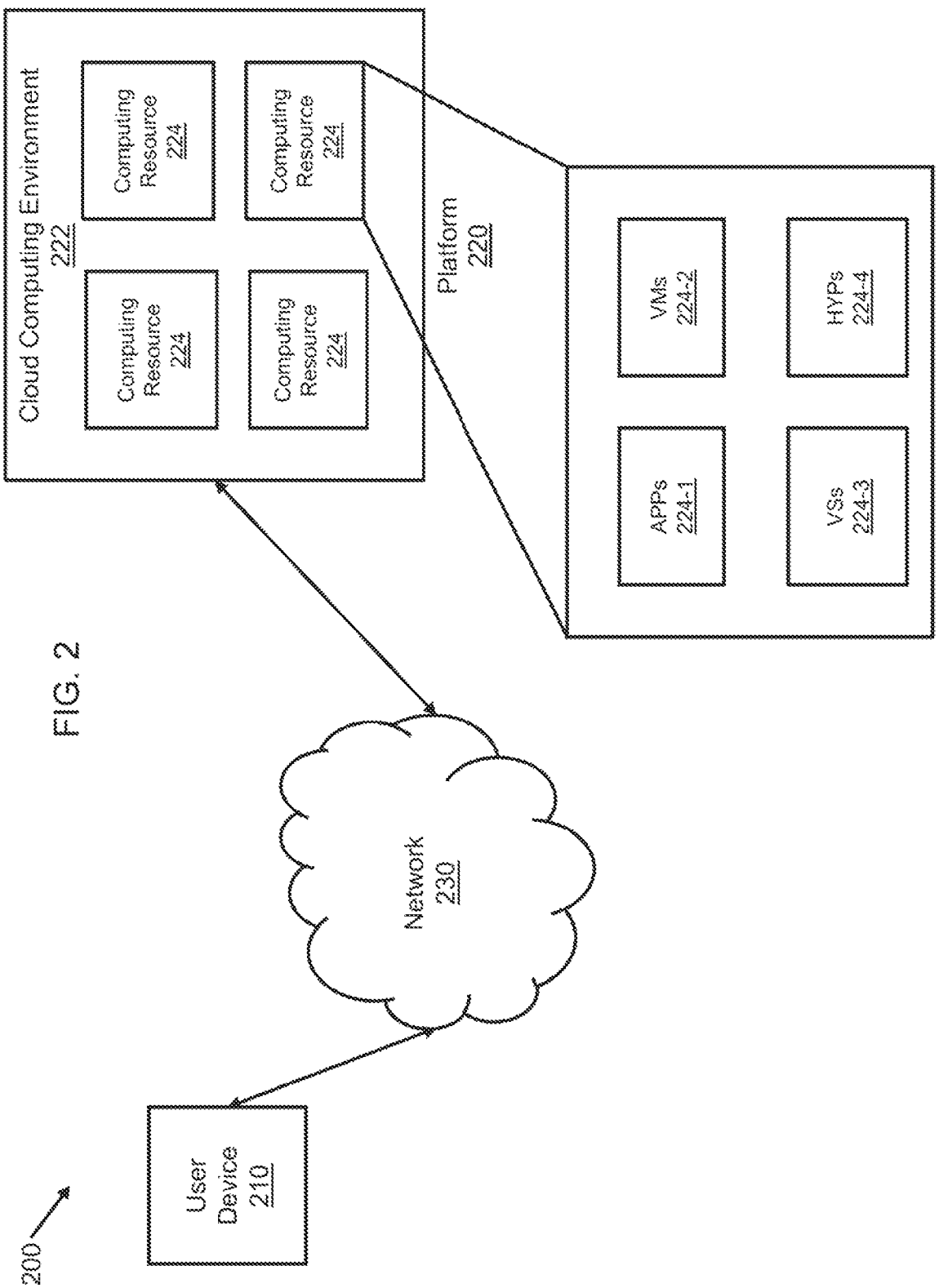
FIG. 2 is an example diagrammatic illustration of a component of the network architecture of FIG. 1, according to embodiments of the present disclosure.

FIG. 2 is a diagram of an example environment 200 in which systems and/or methods, described herein, may be implemented. As shown in FIG. 2, environment 200 may include a user device 210, a platform 220, and a network 230. Devices of environment 200 may interconnect via wired connections, wireless connections, or a combination of wired and wireless connections. In embodiments, any of the functions of the elements included in the telecommunication network 100 may be performed by any combination of elements illustrated in FIG. 2.

Device 210 includes one or more devices capable of receiving, generating, storing, processing, and/or providing information associated with platform 220. For example, device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, device 210 may receive information from and/or transmit information to platform 220. In some embodiments device 210 may include network element 101, user premise equipment 104, user device 103, or any automated guided vehicle.

Platform 220 includes one or more devices capable of providing network services, as described elsewhere herein. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 is not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc. services that do not require end-user (e.g., device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like. Application 224-1 includes one or more software applications that may be provided to or accessed by device 210. Application 224-1 may eliminate a need to install and execute the software applications on device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
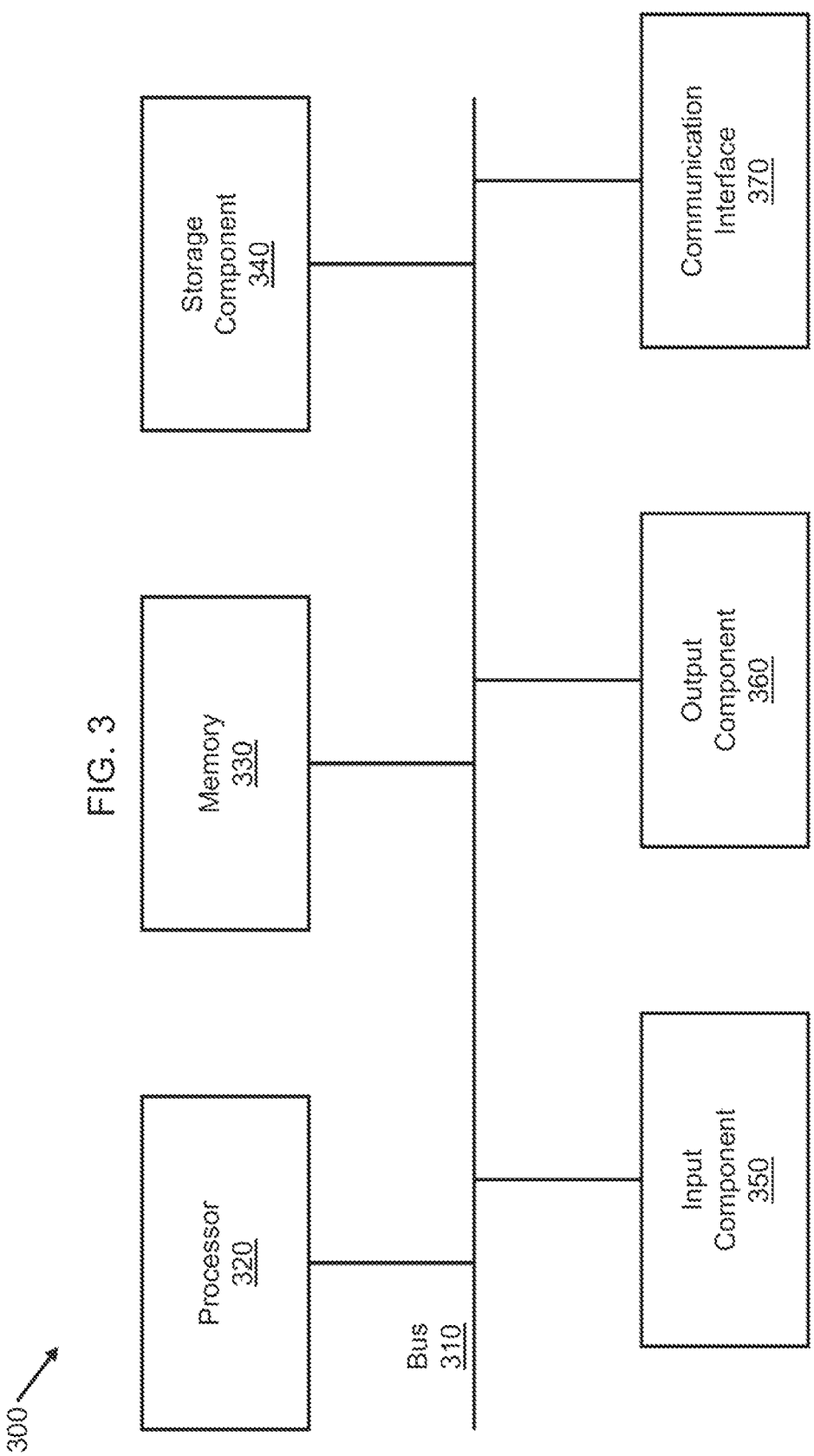
FIG. 3 is an example diagrammatic illustration of a component of the network architecture of FIG. 1, according to embodiments of the present disclosure.

FIG. 3 is a diagram of example components of a device 300. Device 300 may correspond to device 210 and/or platform 220. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable storage medium, along with a corresponding drive. Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

In embodiments, any one of the modules or components of FIG. 1 may be implemented by or using any one of the elements illustrated in FIGS. 2-3.

Figure 4:
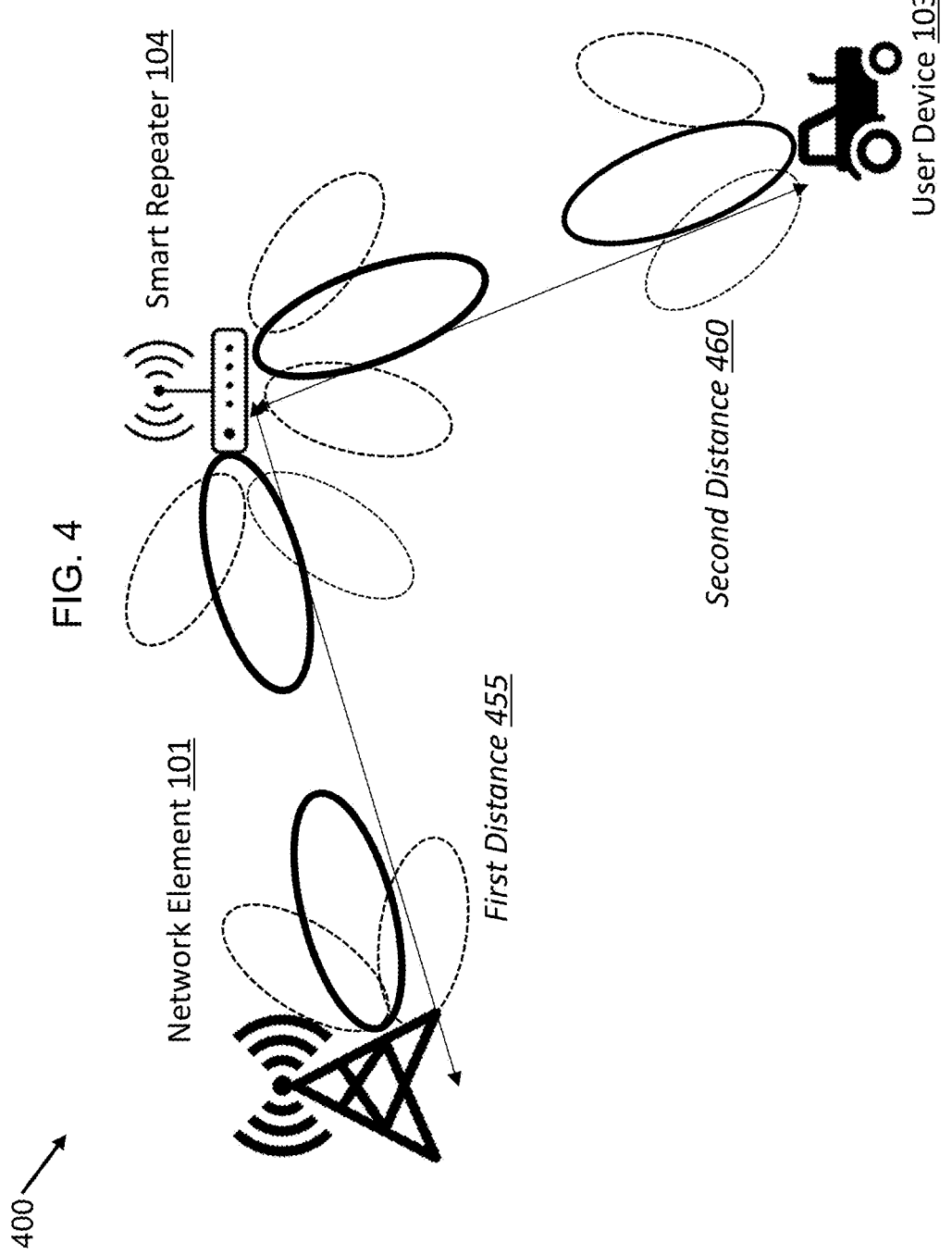
FIG. 4 is an example diagrammatic illustration of a network architecture in which the systems and/or methods described in the present disclosure may be implemented.

FIG. 4 is an example diagrammatic illustration of a network architecture 400 for determining an adjusted and accurate position of the user device when a smart repeater may be present in the propagation path. As shown in FIG. 4, the network architecture 400 may include a network element 101, a smart repeater 104, and a user device 103.

As mentioned above, the network element, the user device, or the core network element may identify the smart repeater that may be in the propagation path of the signal. According to embodiments of the present disclosure, signals relayed by the smart repeater may be identified and measured, and then repeater specific parameters applied to determine an accurate and adjusted position of the user device, largely removing the impact/divergence/distortion caused because of the smart repeater being in the propagation path.

According to some embodiments, known methods and methods described herein may be used to identify and measure the signals relayed by the smart repeater and then, determine a length of the propagation path. This determined or estimated propagation path length may be used in conjunction with a least distance and the absolute position of the smart repeaters to determine the position of the user device.

According to some embodiments, the accurate and adjusted position of the user device may be calculated based on the location of the specific repeater relative to a location of the network element, the location of the specific repeater relative to a location of the user device, timing information associated with one or more signals between the network element and the specific repeater, or processing delay associated with the one or more signals between the network element and the specific repeater.

As an example, based on the signals and information relayed between the smart repeater and the network element, the network element may determine a distance between the network element and the smart repeater and may also determine the absolute position of the smart repeater. According to some embodiments, the network element may determine a total propagation path by utilizing timing information (e.g., the time difference of arrival (TDOA) positioning techniques). Then the network element may identify and/or determine a distance between the user device and the smart repeater. Then, based on the total propagation path, the distance between the network element and the smart repeater, the absolute position of the smart repeater, the timing information, and/or the distance between the user device and the smart repeater, the network element may determine the absolute position of the user device.

As an example, referring now to FIG. 4, based on the signals and information relayed between the smart repeater 104 and the network element 101, a first distance 455, d_{gNB-SR}, between the network element 101 and smart repeater 104 may be determined. Then, using timing information, a total propagation path, d_{gNB-SR}+d_{SR-UE}, may be determined. Now, using the absolute position of the repeater and the total propagation path, timing information, and the first distance 455, the network element may determine the second distance 460 between the smart repeater 104 and user device 103, d_{SR-UE}, which may in turn be used to determine the absolute position of the user device 103.

According to embodiments of the present disclosure, the network element may use processing delay information associated with the smart repeaters to determine the absolute and adjusted position of the user device. The network element may subtract the processing delay information from the total propagation delay. These measurements may be based on one or more TDOA positioning techniques.

Figure 5:
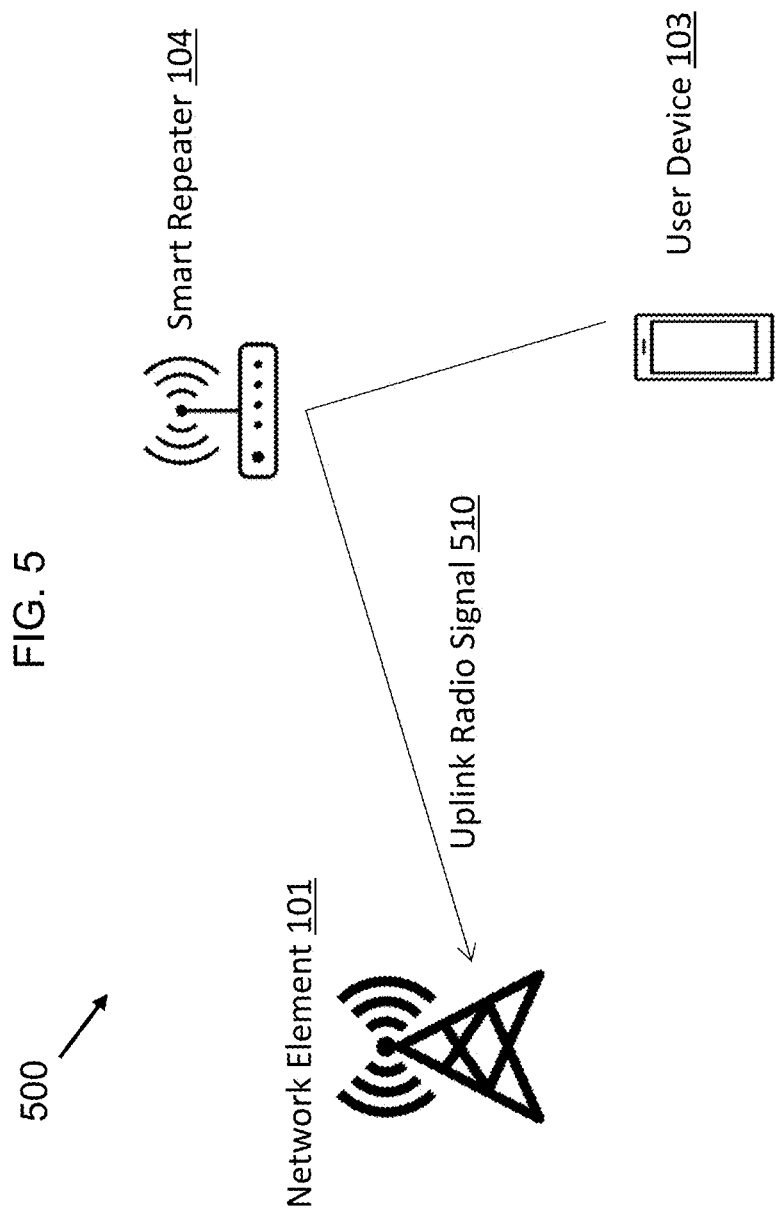
FIG. 5 is an example diagrammatic illustration of a network architecture in which the systems and/or methods described in the present disclosure may be implemented.

FIG. 5 is an example diagrammatic illustration of a network architecture 500 for determining an adjusted and accurate position of the user device during uplink positioning when a smart repeater may be present in the propagation path. As shown in FIG. 5, the network architecture 500 may include a network element 101, a smart repeater 104, and a user device 103.

According to an embodiment, the user device may transmit a uplink radio signal (e.g., sounding reference signal) to the network element via the smart repeater in the propagation path. In an embodiment, the network element may generate a positioning reference relationship table defining a relationship between a positioning reference signal (PRS) ID and a transaction beam ID. The positioning reference signal ID may be associated with a positioning reference signal, and each of the one or more transaction beam ID may be associated with the respective smart repeater from the one or more smart repeaters in the telecommunication network.

Then, according to some embodiments, the network element may identify the specific smart repeater between the network element and the user device based on determining a specific transaction beam ID associated with the specific smart repeater using the positioning reference relationship table. In other words, the network element may identify the smart repeater based on the transaction beam ID in the uplink radio signal matching the beam ID assigned to one of the smart repeaters.

In some embodiments, subsequent to identifying the smart repeater in the propagation path of the network element, the network element may apply repeater specific parameters for positioning and determine the absolute position of the user device.

Figure 6:
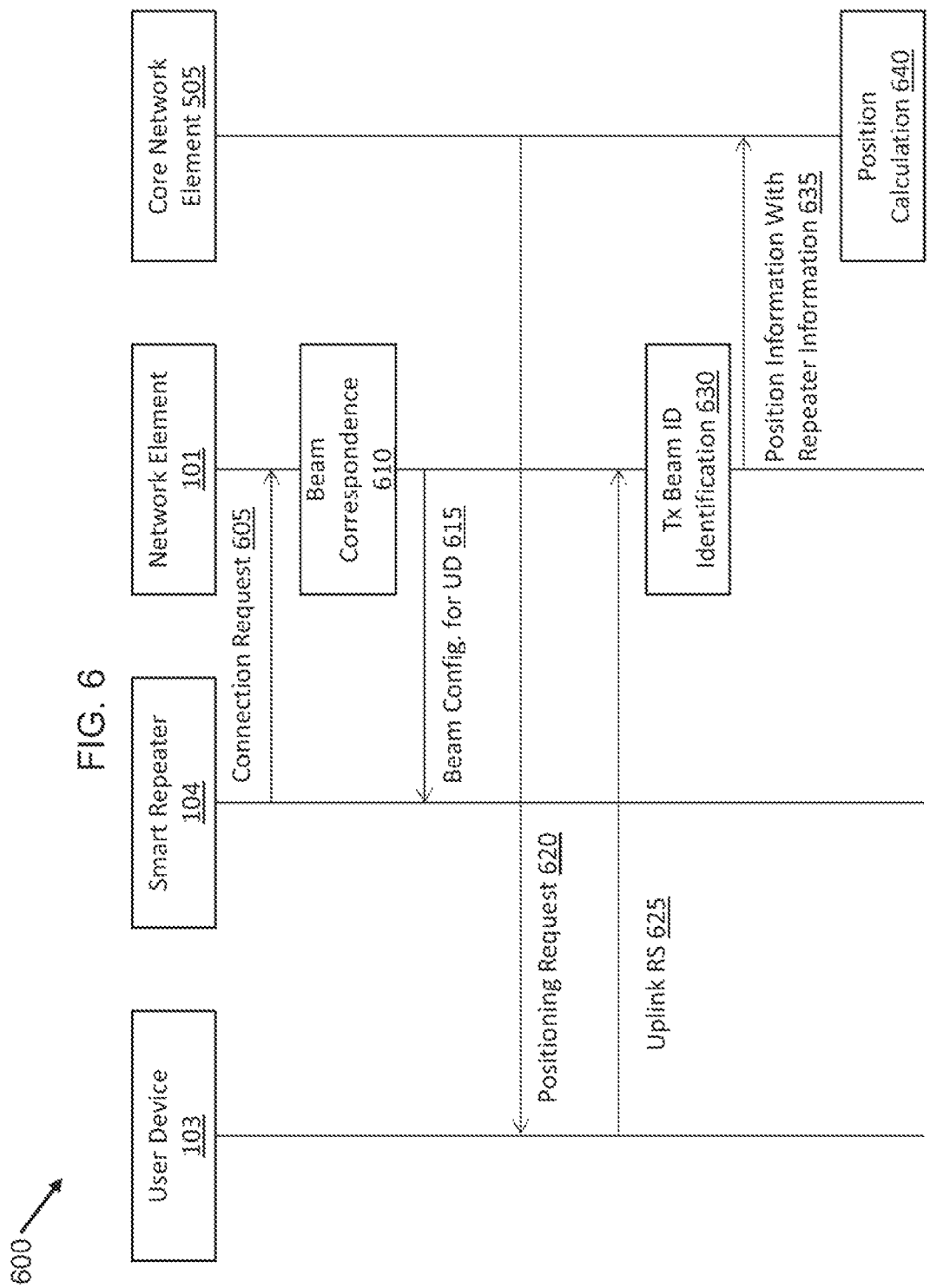
FIG. 6 is an example workflow diagram illustrating an example process for determining enhanced positioning of a user device in a telecommunication network that includes one or more repeaters, according to embodiments of the present disclosure.

An exemplary workflow for determining an adjusted and accurate position of the user device during uplink positioning when a smart repeater may be present in the propagation path is illustrated in FIG. 6.

As seen in FIG. 6, a workflow process 600 may depict one or more operations for determining an adjusted and accurate position of the user device during uplink positioning when a smart repeater may be present in the propagation path.

Operations 605-615 may related to the generation and transmission of beam IDs or transaction beam IDs to respective smart repeaters. At operation 605, a smart repeater may transmit a connection request to the network element to be associated with the network element. As an example, smart repeater 104 may transmit a connection request to the network element 101.

At operation 610, the network element 101 may assign one or more transaction beam IDs, wherein each of the one or more transaction beam ID may be associated with a respective repeater, for example, smart repeater 104. The operation may also include the process of generating, by the network element 101, the positioning reference relationship table, the positioning reference relationship table may include a relationship between a positioning reference signal ID and each of the one or more transaction beam ID. The positioning reference signal ID may be associated with a positioning reference signal, and each of the one or more transaction beam ID may be associated with the respective repeater. In some embodiments, the positioning reference relationship table further includes a flag indicating whether the respective repeater from the one or more repeaters in the telecommunication network may be a smart repeater.

At operation 615, the network element 101 may transmit or broadcast the transaction beam ID associated with each smart repeater to all the smart repeaters included or connected with the network element. As an example, the network element 101 may transmit all the transaction beam IDs associated with the smart repeaters connected to the network element 101, such as smart repeater 104.

At operation 620, the core network element may transmit a positioning request to the user device 103. In some embodiments, the positioning request may be a triggering signal to being the positioning process. In some embodiments, the positioning request may be made periodically or may be triggered by specific telecommunication conditions such as an alert or fault in the provision of network services by the telecommunication network.

At operation 625, an uplink radio signal 510 may be transmitted by the user device 103 to the network element 101. The uplink radio signal may include a significant amount of information, including a PRS ID associated with the uplink radio signal 510.

At operation 630, the network element may identify the specific repeater between the network element and the user device based on determining a specific transaction beam ID associated with the specific repeater using the positioning reference relationship table.

As an example, the network element 101 may identify the transaction beam ID from the PRS ID of the received uplink radio signal 510 using the positioning reference relationship table. If the PRS ID matches an entry in the position reference relationship table, then a corresponding transaction beam ID may be identified. Therefore, the network element 101 may identify the repeater associated with the identified transaction beam ID.

At operation 635, the network element may transmit to the core network element, position information associated with the specific repeater between the network element and the user device. As an example, the network element 101 may transmit the repeater specific parameters (e.g., absolute location of the repeater, TDOA, etc.) to the core network element 405 so that the core network element 405 may calculate the accurate and adjusted position of user device 103 at operation 640 by disregarding the impact of smart repeater 104. The adjusted position may be based on the location of the specific repeater relative to a location of the network element, the location of the specific repeater relative to a location of the user device, timing information associated with one or more signals between the network element and the specific repeater, or processing delay associated with the one or more signals between the network element and the specific repeater.

Figure 7:
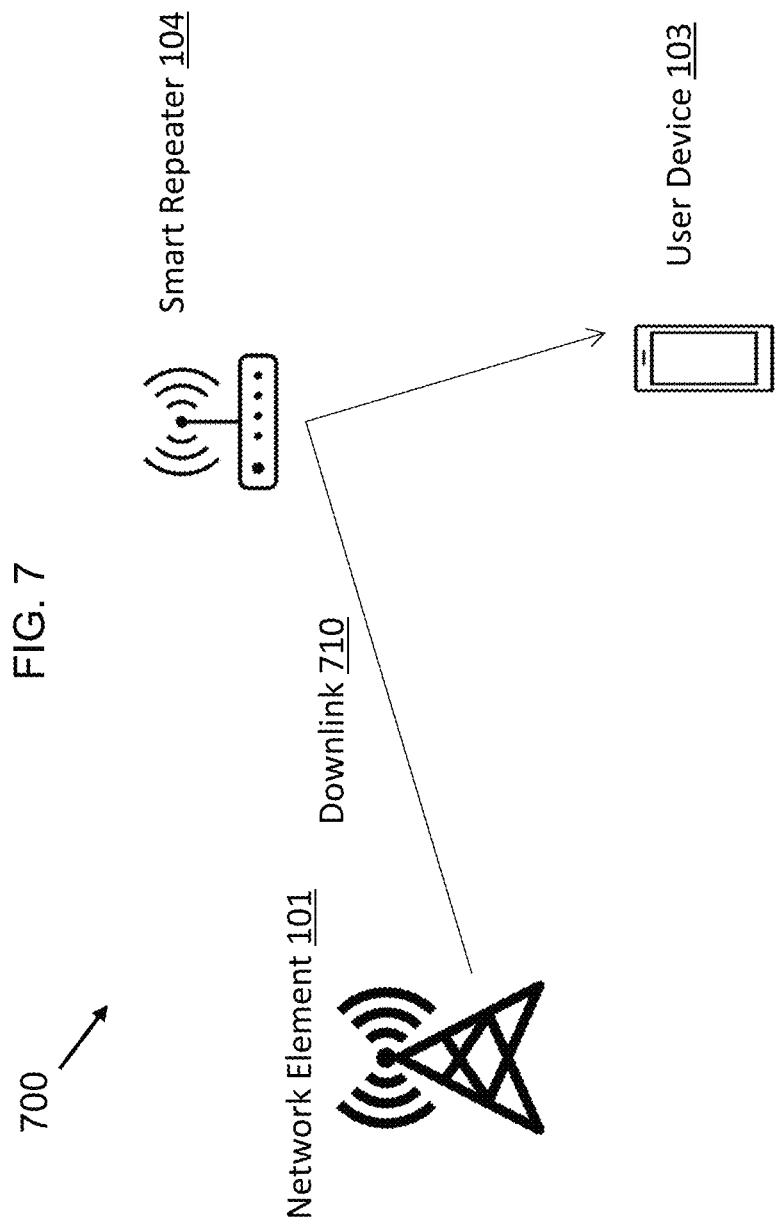
FIG. 7 is an example diagrammatic illustration of a network architecture in which the systems and/or methods described in the present disclosure may be implemented.

FIG. 7 is an example diagrammatic illustration of a network architecture 700 for determining an adjusted and accurate position of the user device during downlink positioning when a smart repeater may be present in the propagation path. As shown in FIG. 7, the network architecture 700 may include a network element 101, a smart repeater 104, and a user device 103.

According to an embodiment, the network element may transmit a downlink radio signal to the user device via the smart repeater in the propagation path.

In an embodiment, the network element may generate a positioning reference relationship table defining a relationship between a positioning reference signal (PRS) ID and a transaction beam ID. The positioning reference signal ID may be associated with a positioning reference signal, and each of the one or more transaction beam ID may be associated with the respective smart repeater from the one or more smart repeaters in the telecommunication network.

Then, according to some embodiments, the network element may identify the specific smart repeater between the network element and the user device based on determining a specific transaction beam ID associated with the specific smart repeater using the positioning reference relationship table. In other words, the network element may identify the smart repeater based on the transaction beam ID in the downlink radio signal matching the beam ID assigned to one of the smart repeaters. In some embodiments, the specific transaction beam ID may be determined based on a downlink radio signal transmission and a received measurement report.

Then, according to some embodiments, the network element may identify the specific smart repeater between the network element and the user device based on determining a specific transaction beam ID and the positioning measurement report.

In some embodiments, subsequent to identifying the smart repeater in the propagation path of the network element, the network element may apply repeater specific parameters for positioning and determine the absolute position of the user device.

By identifying transaction beam IDs at the network elements for repeaters, the network element may identify whether the positioning measurement report of the downlink reference signals may be from repeaters or not. For positioning based on the positioning measurement report from repeaters, network element or core network element can utilize known information about repeaters.

Figure 8:
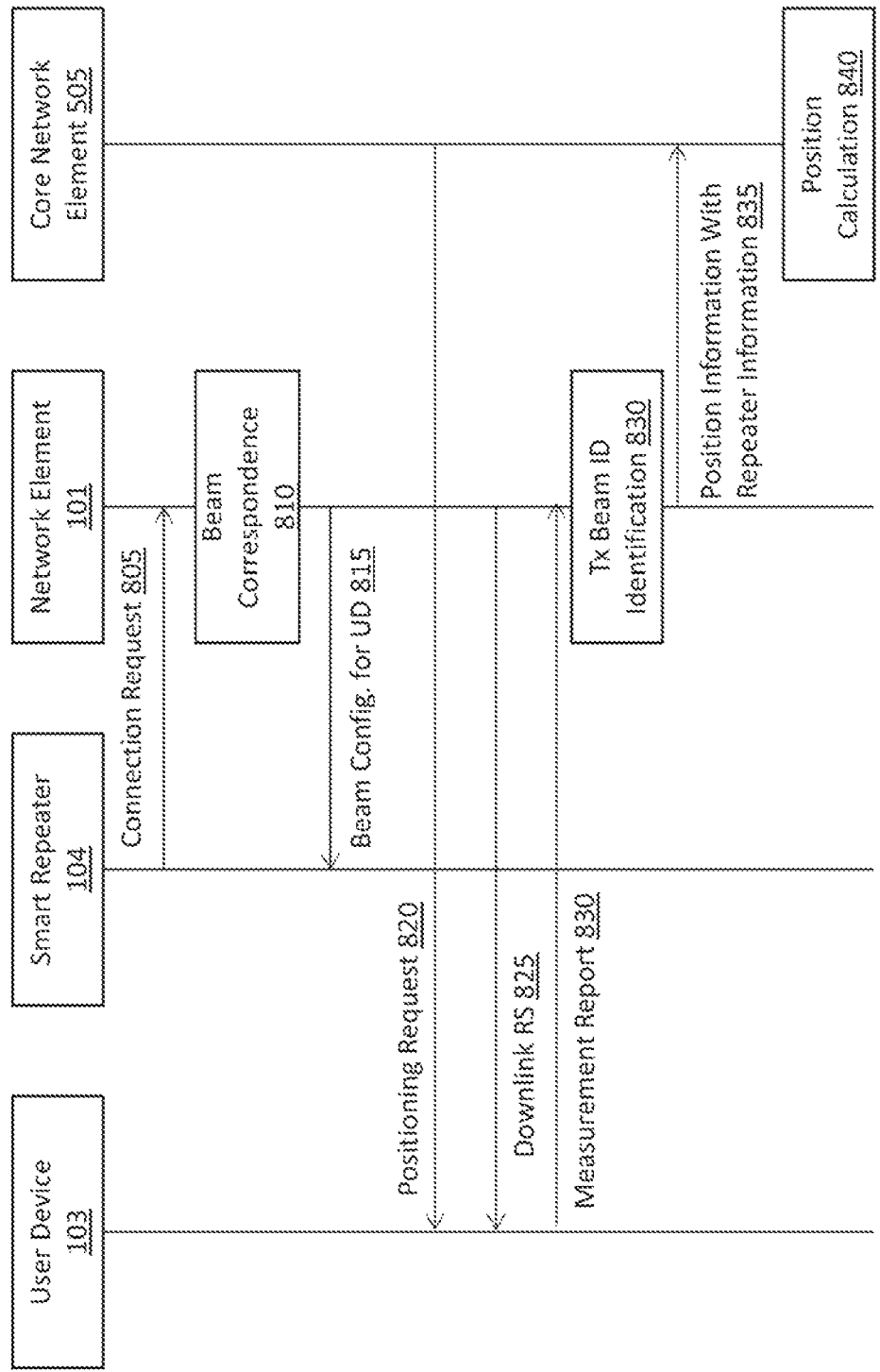
FIG. 8 is an example workflow diagram illustrating an example process for determining enhanced positioning of a user device in a telecommunication network that includes one or more repeaters, according to embodiments of the present disclosure.

An exemplary workflow for determining an adjusted and accurate position of the user device during downlink positioning when a smart repeater may be present in the propagation path is illustrated in FIG. 8.

As seen in FIG. 8, a workflow process 800 may depict one or more operations for determining an adjusted and accurate position of the user device during downlink positioning when a smart repeater may be present in the propagation path.

Operations 805-820 may be similar to operations 605-620 in workflow 600 related to the generation and transmission of beam IDs or transaction beam IDs to respective smart repeaters.

At operation 825, a downlink radio signal 710 may be transmitted by network element 101 to the user device 103. The downlink radio signal may include a significant amount of information, including a PRS ID associated with the downlink radio signal 710.

At operation 830, the measurement report generated by the user device 103 may be transmitted to the network element 101.

At operation 835, the network element may transmit to the core network element, position information associated with the specific repeater between the network element and the user device. As an example, the network element 101 may transmit the repeater specific parameters (e.g., absolute location of the repeater, TDOA, etc.) to the core network element 405 so that the core network element 405 may calculate the accurate and adjusted position of user device 103 at operation 840 by disregarding the impact of smart repeater 104. The adjusted position may be based on the location of the specific repeater relative to a location of the network element, the location of the specific repeater relative to a location of the user device, timing information associated with one or more signals between the network element and the specific repeater, or processing delay associated with the one or more signals between the network element and the specific repeater.

By identifying transaction beam IDs at network elements for repeaters, the network element may identify whether the positioning measurement report of the downlink reference signals is from repeaters or not. For positioning based on the report from repeaters, the network elements, and the core network element may utilize known information about repeaters.

Figure 9:
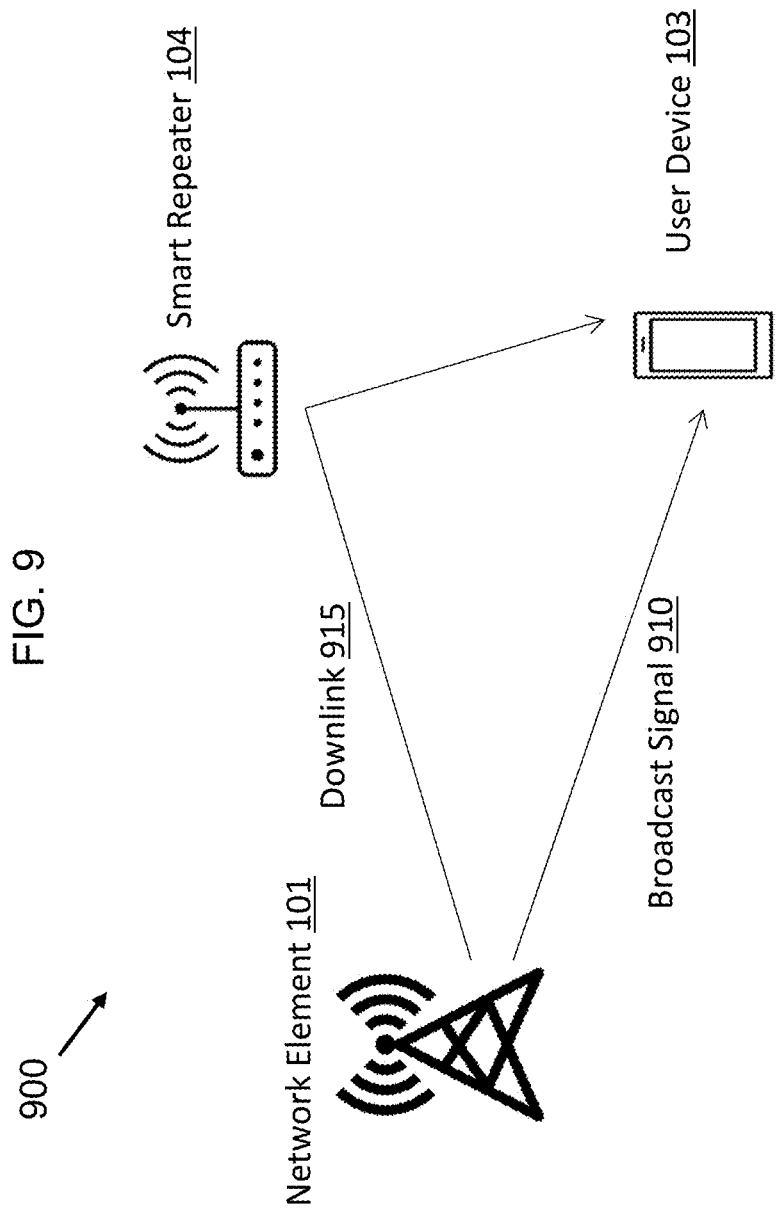
FIG. 9 is an example diagrammatic illustration of a network architecture in which the systems and/or methods described in the present disclosure may be implemented.

FIG. 9 is an example diagrammatic illustration of a network architecture 900 for determining an adjusted and accurate position of the user device during downlink or broadcast positioning when a smart repeater may be present in the propagation path. As shown in FIG. 9, the network architecture 900 may include a network element 101, a smart repeater 104, and a user device 103.

According to an embodiment, the network element may transmit a downlink radio signal to the user device via the smart repeater in the propagation path, but the user device may calculate its own accurate and adjusted position using a broadcast positioning.

To identify the presence of a smart repeater, on a broadcast based positioning, the network element or the core network element may generate a positioning reference relationship table defining a relationship between a positioning reference signal (PRS) ID and a transaction beam ID. The positioning reference signal ID may be associated with a positioning reference signal, and each of the one or more transaction beam ID may be associated with the respective smart repeater from the one or more smart repeaters in the telecommunication network. Then, the network element or the core network element, may broadcast the positioning reference relationship table and position information associated with the one or more repeaters in the telecommunication network. In some embodiments, the network element, or the core network element may broadcast the positioning reference relationship table that may further a flag indicating whether the respective repeater from the one or more repeaters in the telecommunication network may be a smart repeater.

In some embodiments, subsequent to the broadcasting of the positioning reference relationship table, the user device may identify the specific smart repeater between the network element and the user device based on determining a specific transaction beam ID associated with the specific smart repeater using the positioning reference relationship table. Then based on identifying the transaction beam ID of the specific smart receiver, the user device may request information associated with the specific smart repeater. In response to the request, the core network element may transmit to the user device, position information associated with the specific repeater between the network element and the user device.

Then, the user device may calculate its own accurate and adjusted position based on the position information associated with the specific repeater and information gained from the PRS.

Figure 10:
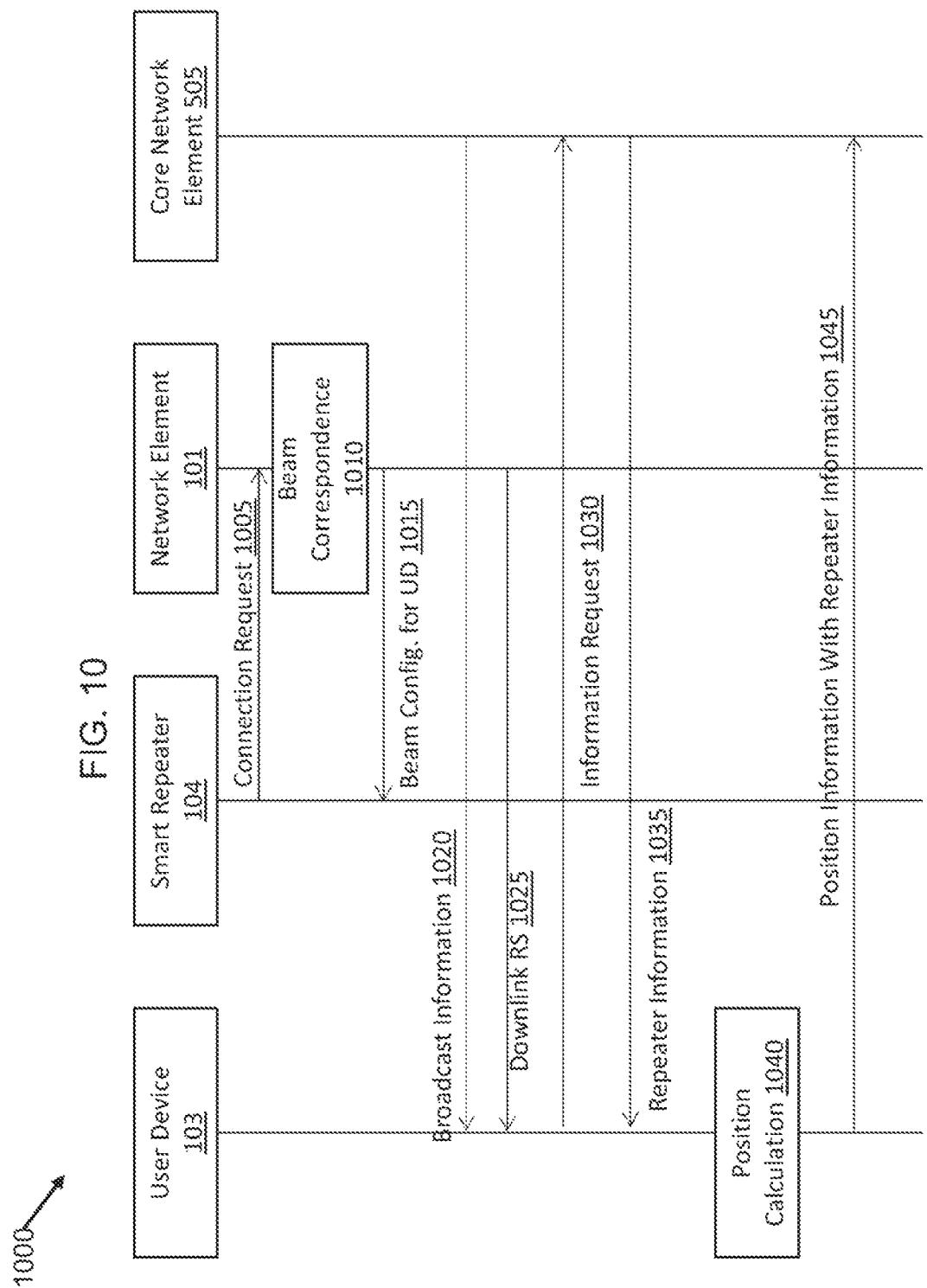
FIG. 10 is an example workflow diagram illustrating an example process for determining enhanced positioning of a user device in a telecommunication network that includes one or more repeaters, according to embodiments of the present disclosure.

An exemplary workflow for determining an adjusted and accurate position of the user device during downlink or broadcast positioning when a smart repeater may be present in the propagation path is illustrated in FIG. 10.

As seen in FIG. 10, a workflow process 1000 may depict one or more operations for determining an adjusted and accurate position of the user device during downlink or broadcast positioning when a smart repeater may be present in the propagation path.

Operations 1005-1015 may be similar to operations 605-615 in workflow 600 and 805-815 in workflow 800 and may relate to the generation and transmission of beam IDs or transaction beam IDs to respective smart repeaters.

At operation 1020, the core network element may broadcast the positioning reference relationship table and position information associated with the one or more repeaters in the telecommunication network using broadcast signal 910. In some embodiments, the network element, or the core network element may broadcast the positioning reference relationship table that may further a flag indicating whether the respective repeater from the one or more repeaters in the telecommunication network is a smart repeater.

At operation 1025, a downlink radio signal 915 may be transmitted by network element 101 to the user device 103. The downlink radio signal may include a significant amount of information, including a PRS ID associated with the downlink radio signal 915.

At operation 1030, subsequent to the broadcasting of the positioning reference relationship table, the user device may identify the specific smart repeater between the network element and the user device based on determining a specific transaction beam ID associated with the specific smart repeater using the positioning reference relationship table. Then based on identifying the transaction beam ID of the specific smart receiver, the user device may request information associated with the specific smart repeater.

In response to the request, at operation 1035, the core network element may transmit to the user device, position information associated with the specific repeater between the network element and the user device. As an example, the core network element may transmit the repeater specific parameters (e.g., absolute location of the repeater, TDOA, etc.) to the user device 103

Figure 11:
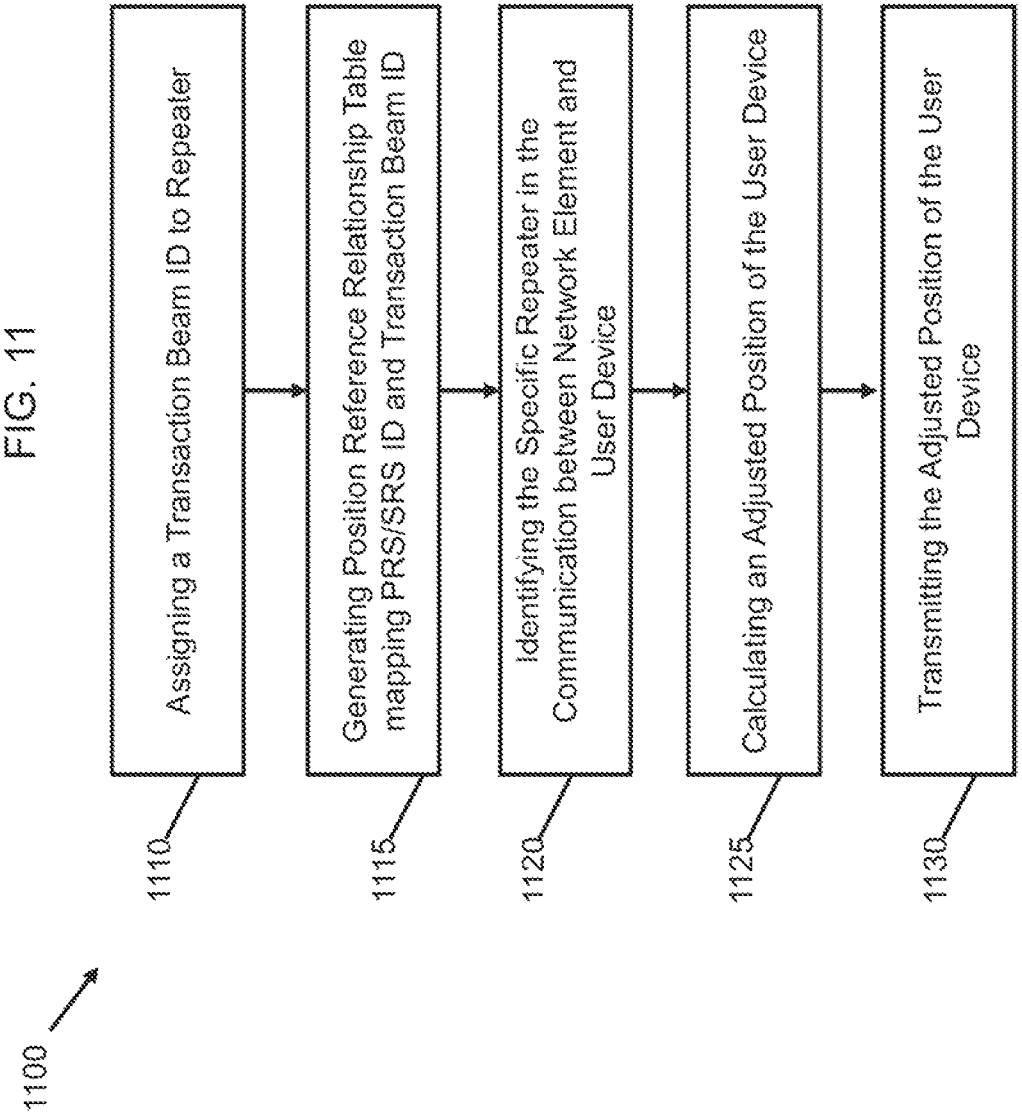
FIG. 11 is an exemplary flowchart illustrating an example process for determining enhanced positioning of a user device in a telecommunication network that includes one or more repeaters, according to embodiments of the present disclosure.

At operation 1040, the user device 103 may calculate the accurate and adjusted position of user device 103 by disregarding the impact of smart repeater 104. The adjusted position may be based on the location of the specific repeater relative to a location of the network element, the location of the specific repeater relative to a location of the user device, timing information associated with one or more signals between the network element and the specific repeater, or processing delay associated with the one or more signals between the network element and the specific repeater FIG. 11 is an exemplary flowchart illustrating an example process 1100 for enhanced positioning of a user device in a telecommunication network that includes one or more repeaters in a communication between a network element and the user device, according to embodiments.

According to embodiments, operation 1110 may include, assigning, by the network element, one or more transaction beam ID, each of the one or more transaction beam ID being associated with a respective repeater from the one or more repeaters in the telecommunication network. In some embodiments, the communication between the network element and the user device may be downlink communication, and wherein the specific transaction beam ID may be determined based on a downlink radio signal transmission and a received measurement report.

According to embodiments, operation 1115 may include, generating, by the network element, a positioning reference relationship table, the positioning reference relationship table may include a relationship between a positioning reference signal ID and each of the one or more transaction beam ID, the positioning reference signal ID may be associated with a positioning reference signal, and each of the one or more transaction beam ID may be associated with the respective repeater from the one or more repeaters in the telecommunication network. According to some embodiments, the positioning reference relationship table may further include a flag indicating whether the respective repeater from the one or more repeaters in the telecommunication network may be a smart repeater.

According to embodiments, operation 1120 may include, identifying, by the network element, the specific repeater between the network element and the user device, wherein the identifying may be based on determining a specific transaction beam ID associated with the specific repeater using the positioning reference relationship table. In some embodiments, operation 1120 may also include transmitting, by the network element to the core element, position information associated with the specific repeater between the network element and the user device.

According to embodiments, operation 1125 may include, calculating, by the network element, the core network element, or the user device, the adjusted position of the user device. In some embodiments, the adjusted position may be calculated based on the location of the specific repeater relative to a location of the network element, the location of the specific repeater relative to a location of the user device, timing information associated with one or more signals between the network element and the specific repeater, or processing delay associated with the one or more signals between the network element and the specific repeater.

According to embodiments, operation 1130 may include, receiving, by a core network element, an adjusted position of the user device, the adjusted position of the user device may be adjusted for a location of a specific repeater between the network element and the user device.

In some embodiments, at operation 1130, the user device may calculate the adjusted position of the user device. In some embodiments, when the user device may calculate the adjusted position of the user device, the operation 1130 may include broadcasting, by the core network element, the positioning reference relationship table. Then, based on the specific repeater being a smart repeater, the operation 1103 may include receiving, by the core network element from the user device, a smart repeater ID of the specific repeater. Subsequent to receiving the smart repeater ID, operation 1130 may include transmitting, by the core network element to the user device, position information associated with the specific repeater between the network element and the user device.

As another example, in some embodiments, at operation 1130, the user device may calculate the adjusted position of the user device. In some embodiments, when the user device may calculate the adjusted position of the user device, the operation 1130 may include broadcasting, by the core network element, the positioning reference relationship table and position information associated with the one or more repeaters in the telecommunication network prior to the core network element receiving the adjusted position of the user device.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method for enhanced positioning of a user device in a telecommunication network that includes one or more repeaters in a communication between a network element and the user device, the method executed by one or more processors, the method comprising:

assigning, by the network element, one or more transaction beam ID, each of the one or more transaction beam ID being associated with a respective repeater from the one or more repeaters in the telecommunication network;

generating, by the network element, a positioning reference relationship table, the positioning reference relationship table including a relationship between a positioning reference signal ID and each of the one or more transaction beam ID, the positioning reference signal ID being associated with a positioning reference signal, and each of the one or more transaction beam ID being associated with the respective repeater from the one or more repeaters in the telecommunication network; and receiving, by a core element, an adjusted position of the user device, the adjusted position of the user device being adjusted for a location of a specific repeater between the network element and the user device, wherein the adjusted position of the user device is calculated by the user device, and the method, prior to receiving the adjusted position of the user device, comprises:

broadcasting, by the core element, the positioning reference relationship table and position information associated with the one or more repeaters in the telecommunication network.

2. The method of claim 1, wherein the adjusted position is calculated based on at least two of: the location of the specific repeater relative to a location of the network element, the location of the specific repeater relative to a location of the user device, timing information associated with one or more signals between the network element and the specific repeater, or processing delay associated with the one or more signals between the network element and the specific repeater.

3. The method of claim 1, wherein prior to receiving the adjusted position of the user device, the method comprises:

identifying, by the network element, the specific repeater between the network element and the user device, wherein the identifying is based on determining a specific transaction beam ID associated with the specific repeater using the positioning reference relationship table; and transmitting, by the network element to the core element, position information associated with the specific repeater between the network element and the user device.

4. The method of claim 3, wherein the communication between the network element and the user device is downlink communication, and wherein the specific transaction beam ID is determined based on a downlink radio signal transmission and a received measurement report.

5. The method of claim 3, wherein the adjusted position of the user device is calculated by the core element of the telecommunication network.

6. The method of claim 1, wherein the method, prior to receiving the adjusted position of the user device, comprises:

based on the specific repeater being a smart repeater, receiving, by the core element from the user device, a smart repeater ID of the specific repeater; and transmitting, by the core element to the user device, position information associated with the specific repeater between the network element and the user device.

7. The method of claim 1, wherein the positioning reference relationship table further includes a flag indicating whether the respective repeater from the one or more repeaters in the telecommunication network is a smart repeater.

8. An apparatus for enhanced positioning of a user device in a telecommunication network that includes one or more repeaters in a communication between a network element and the user device, the apparatus comprising:
at least one memory configured to store computer program code; and
at least one processor configured to access the computer program code and operate as instructed by the computer program code, the computer program code including:
first assigning code configured to cause a first processor to assign one or more transaction beam ID, each of the one or more transaction beam ID being associated with a respective repeater from the one or more repeaters in the telecommunication network;
first generating code configured to cause the first processor to generate a positioning reference relationship table, the positioning reference relationship table including a relationship between a positioning reference signal ID and each of the one or more transaction beam ID, the positioning reference signal ID being associated with a positioning reference signal, and each of the one or more transaction beam ID being associated with the respective repeater from the one or more repeaters in the telecommunication network; and
first receiving code configured to cause a second processor to receive an adjusted position of the user device, the adjusted position of the user device being adjusted for a location of a specific repeater between the network element and the user device,
wherein the adjusted position of the user device is calculated by a third processor, wherein the third processor is a part of the user device, and wherein prior to the first receiving code, the program code further comprises:
broadcasting code configured to cause the second processor to broadcast the positioning reference relationship table and position information associated with the one or more repeaters in the telecommunication network.

9. The apparatus of claim 8, wherein the adjusted position is calculated based on at least two of: the location of the specific repeater relative to a location of the network element, the location of the specific repeater relative to a location of the user device, timing information associated with one or more signals between the network element and the specific repeater, or processing delay associated with the one or more signals between the network element and the specific repeater.

10. The apparatus of claim 8, wherein prior to the first receiving code, the program code further comprises:
first identifying code configured to cause the first processor to identify the specific repeater between the network element and the user device, wherein the identifying is based on determining a specific transaction beam ID associated with the specific repeater using the positioning reference relationship table; and
first transmitting code configured to cause the first processor to transmit to the second processor, position information associated with the specific repeater between the network element and the user device.

11. The apparatus of claim 10, wherein the communication between the network element and the user device is downlink communication, and wherein the specific transaction beam ID is determined based on a downlink radio signal transmission and a received measurement report.

12. The apparatus of claim 10, wherein the adjusted position of the user device is calculated by the second processor, and wherein the second processor is a part of a core element of the telecommunication network.

13. The apparatus of claim 8, wherein prior to the first receiving code, the program code further comprises:
based on the specific repeater being a smart repeater, second receiving code configured to cause the second processor to receive from the first processor a smart repeater ID of the specific repeater; and
second transmitting code configured to cause the second processor to transmit to the first processor, position information associated with the specific repeater between the network element and the user device.

14. The apparatus of claim 8, wherein the positioning reference relationship table further includes a flag indicating whether the respective repeater from the one or more repeaters in the telecommunication network is a smart repeater.

15. A non-transitory computer readable medium storing a program causing a computer system to execute a process, the process comprising:
assigning, by a network element, one or more transaction beam ID, each of the one or more transaction beam ID being associated with a respective repeater from one or more repeaters in a telecommunication network;
generating, by the network element, a positioning reference relationship table, the positioning reference relationship table including a relationship between a positioning reference signal ID and each of the one or more transaction beam ID, the positioning reference signal ID being associated with a positioning reference signal, and each of the one or more transaction beam ID being associated with the respective repeater from the one or more repeaters in the telecommunication network; and
receiving, by a core element, an adjusted position of the user device, the adjusted position of the user device being adjusted for a location of a specific repeater between the network element and the user device,
wherein the adjusted position of the user device is calculated by the user device, and the method, prior to receiving the adjusted position of the user device, comprises:
broadcasting, by the core element, the positioning reference relationship table and position information associated with the one or more repeaters in the telecommunication network.

16. The non-transitory computer readable medium of claim 15, wherein the adjusted position is calculated based on at least two of: the location of the specific repeater relative to a location of the network element, the location of the specific repeater relative to a location of the user device, timing information associated with one or more signals between the network element and the specific repeater, or processing delay associated with the one or more signals between the network element and the specific repeater.

17. The non-transitory computer readable medium of claim 15, wherein prior to receiving the adjusted position of the user device, the process further comprises:
identifying, by the network element, the specific repeater between the network element and the user device, wherein the identifying is based on determining a specific transaction beam ID associated with the specific repeater using the positioning reference relationship table; and transmitting, by the network element to the core element, position information associated with the specific repeater between the network element and the user device.

18. The non-transitory computer readable medium of claim 15, wherein the method, prior to receiving the adjusted position of the user device, comprises:
based on the specific repeater being a smart repeater, receiving, by the core element from the user device, a smart repeater ID of the specific repeater; and
transmitting, by the core element to the user device, position information associated with the specific repeater between the network element and the user device.

\* \* \* \* \*